(12) United States Patent
Lane

(10) Patent No.: US 6,407,673 B1
(45) Date of Patent: Jun. 18, 2002

(54) TRANSIT VEHICLE MULTIMEDIA BROADCAST SYSTEM

(75) Inventor: David E. Lane, New York, NY (US)

(73) Assignee: The Rail Network, Inc., New York, NY (US)

( * ) Notice: Subject to any disclaimer, the term of this patent is extended or adjusted under 35 U.S.C. 154(b) by 0 days.

(21) Appl. No.: 09/947,057

(22) Filed: Sep. 4, 2001

(51) Int. Cl.[7] .................................................. G08G 1/00
(52) U.S. Cl. ........................ 340/901; 340/905; 455/517
(58) Field of Search .................................. 340/901, 905, 340/903, 904, 933, 988, 991, 994, 928, 539; 455/517, 456; 701/1, 117

(56) References Cited

U.S. PATENT DOCUMENTS

| | | | |
|---|---|---|---|
| 5,493,295 A | | 2/1996 | Lewiner et al. |
| 5,555,466 A | | 9/1996 | Scribner et al. |
| 5,982,298 A | * | 11/1999 | Lappenbusch et al. ...... 340/905 |
| 6,130,626 A | | 10/2000 | Kane et al. |
| 6,177,887 B1 | | 1/2001 | Jerome |
| 6,223,027 B1 | | 4/2001 | Ono et al. |
| 6,359,571 B1 | * | 3/2002 | Endo et al. .................. 340/988 |

* cited by examiner

*Primary Examiner*—Anh La
(74) *Attorney, Agent, or Firm*—Patton Boggs LLP

(57) ABSTRACT

The transit vehicle multimedia broadcast system comprises a multimedia broadcast system for broadcasting stored audio, video, graphic and/or text messages to passengers on transit vehicles that travel a predetermined route in areas where traditional multimedia broadcast is not available, such as in subway tunnels. The system includes at least one storage device along the predetermined route that stores multimedia data and wirelessly transmits the data to at least one transit transceiver located on the transit vehicles while the vehicle are stationary at a location corresponding to the location of the storage device. The multimedia can be stored on the vehicle and transmitted using one of a plurality of transmission devices to a plurality of video graphic display devices located in the transit vehicles. The broadcast can also be wirelessly transmitted via predetermined FM or wireless frequencies for receipt via passenger radios, laptop computers including wireless connection, cell phones, or any other device capable of receiving the FM or wireless transmission of multimedia. The multimedia data can include graphics, text, audio, video, or any combination thereof. The multimedia data can be translated and stored into two or more languages for broadcast. Portions of the stored multimedia data can be updated or changed along the transit vehicle's route.

23 Claims, 4 Drawing Sheets

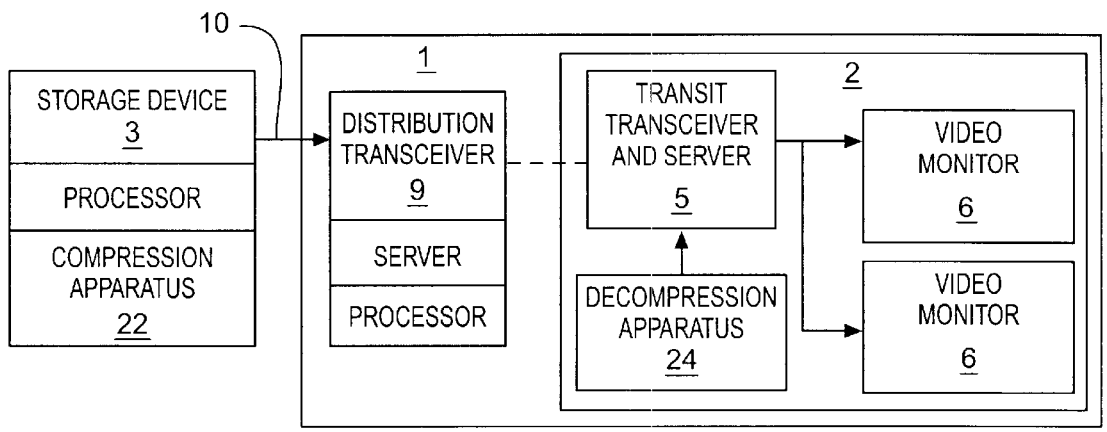
FIG. 3
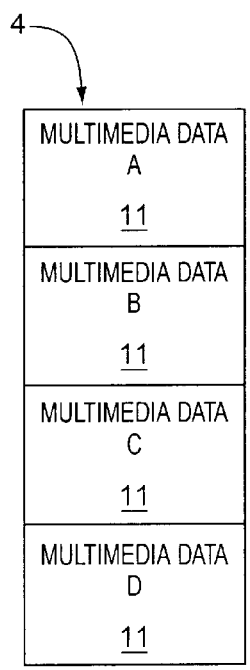 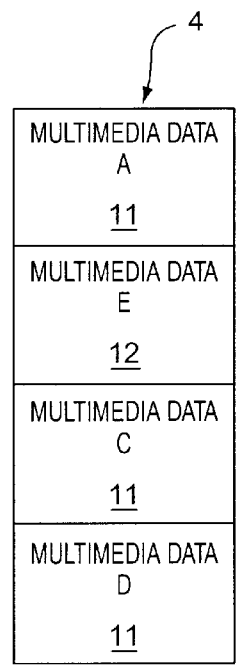
FIG. 4A  FIG. 4B

TRANSIT VEHICLE MULTIMEDIA BROADCAST SYSTEM

FIELD OF THE INVENTION

This invention relates to broadcast systems, and more particularly to a transit vehicle multimedia broadcast system that wirelessly transmits multimedia data to transit vehicles for distribution to passengers traveling on the vehicle within a confined area that lacks or does not receive traditional wireless broadcast reception.

PROBLEM

Broadcast systems for passengers traveling in vehicles include closed circuit systems and wireless broadcast in the public domain. Closed circuit systems are limited to broadcast apparatus that read and distribute prerecorded content stored on cassettes, discs or other storage medium to audio/visual devices connected to the broadcast apparatus.

Wireless broadcast includes AM/FM audio and television signals received by individual radios or televisions and cellular broadcast for cellular telephones or other devices capable of receiving cellular frequencies. Wireless broadcast is aerial and is blocked by some solid masses or objects and the signals weaken with distance. Areas that are unable to receive the wireless broadcast are said to be out of the broadcast range. Wireless broadcast is not suitable for transit vehicles traveling in a closed environment, such as underground subways and commuter trains, vehicles traveling in remote areas, such as airplanes, trains and busses, or vehicles traveling at speeds that prevent hand-off of cellular signals or reception of continuous AM/FM or video broadcast.

First Class of Transit Vehicle Broadcast Systems is Limited to Position Data Broadcast systems for transit vehicles are disclosed for transmitting data relating to the location of the vehicle in Kane et al. and Lewiner, et al. (U.S. Pat. Nos. 6,130,626 and 5,493,295 respectively). Kane et al., discloses a system for identifying the location of transit vehicles, primarily buses, and transmitting that data to other vehicles on the same route allowing each vehicle to track the distance between other vehicles on the route. Lewiner, et al., discloses a system that identifies the instantaneous position of a bus traveling over a network, calculates the distance between the bus and the bus stop, and transmits the data to the bus stop via an electromagnetic path. The receiver at the bus stop displays the waiting time for the vehicle based on the data received.

The first class of transit vehicle broadcast systems is limited to providing data relating to the position of the transit vehicles. Position data is collected as the vehicle passes predetermined locations along the route and is wirelessly transmitted to the station. The data received at the station is either displayed to individuals waiting for vehicle arrivals or used to map road details including traffic or vehicle locations with respect to other vehicles traveling the same route. The disclosed systems are limited to collection and transmission of position data and do not include means for distributing the position data to passengers traveling on the transit vehicle.

Second Class of Transit Broadcast Systems is Limited Content and Directed to Stations Ono, et al. (U.S. Pat. No. 6,223,027) discloses a system that transmits image data to be displayed at predetermined locations containing a stationary transceiver, storage system and a means for displaying the received data. In Ono, a plurality of transit vehicles having mobile transceivers store image data then sequentially transmit blocks of the stored data to stationary transceivers while the vehicle is temporarily paused at that station. The received data and a pointer used to identify which blocks of data have been received are stored at the stationary transceiver. When the next vehicle arrives at the station, the stationary transceiver transmits a pointer signal so that the vehicle can transmit blocks that have not yet been received. Once the complete image has been transmitted to the stationary transceiver, the image is displayed on a video graphic display means at the station. Thus, the vehicles containing mobile transceivers function as a transmission line and can provide continually updated data for news or advertisement displays.

The transit vehicles, trains in this example, function as a transmission line, each train wirelessly transmitting a next sequential block of the video image to the stationary transceiver at the station. While the broadcast system provides a means for wirelessly transmitting updated data to a stationary transceiver, it does not provide a means for displaying the stored image data or any other data to passengers traveling on the vehicle.

Third Class of Broadcast System is Limited Content Directed to Individual Passengers The audio/visual system disclosed by Scribner, (U.S. Pat. No. 5,555,466) includes a video graphic display, headset connection, and selector for individual passengers for use in vehicles where each passenger has an individual seat. The audio/visual unit is located in the seat back of the seat in front of the passenger and allows each passenger to select from a plurality of pre-recorded sources stored in a distribution box. Similarly, Jerome (U.S. Pat No. 6,177,887) discloses an aircraft video system that receives information from passengers, sends information to passengers, or can be used by passengers for entertainment such as video games. The system disclosed by Jerome includes video graphic display units on the reverse side of the passenger food/convenience trays that store in the seatback and can be used by each passenger to make food and beverage selections and allows the flight crew to display flight or advertisement information. Both Scribner and Jones, disclose systems for broadcasting prerecorded content that is stored within the vehicle. Neither provides a means for updating the content.

Another known system for providing information to passengers aboard an aircraft is the audio system provided on most commercial aircraft that allow the passenger to listen to a selection of music or other audio via a headset adapter located at each passenger location. The same connection provides audio, on a different channel, when prerecorded content such as movies or advertisements is played. The audio portion of the movie or advertisement is distributed to the audio system on a different channel. The prerecorded content is stored on a removable diskette or cartridge that is not updated during predetermined stops along the vehicle's route. When safety information is distributed to passengers, one or more fixed video display screens display the video and the audio is broadcast over the aircraft's intercom system.

The systems just described are limited to use on transit vehicles where each passenger has an individual seat. The system fails to provide a means for broadcasting to passengers that are standing in a crowded vehicle or seated in seats that lack seatbacks in front of them. Both the audio and the video are distributed via a hard-wired broadcast system and the content is limited to pre-recorded audio and/or video selections stored on the vehicle or on media compatible with the closed circuit system. The selection is not regularly updated at terminals and does not provide updated news, weather or other information.

The third class of transit vehicle audio/video systems are limited to distribution of stored content, they fail to include a means for updating the content during stops along the route. The systems are also hard-wired and do not provide a means for wirelessly receiving updated data such as local weather or traffic reports, local and national news service reports, or advertisements directed to the vehicles destination or next stop. They are also limited to providing information via audio and or video equipment provided within the transit vehicle.

The broadcast systems just described fail to provide a means for broadcasting updated multimedia data to passengers. While the first class of broadcast systems receive and transmit updated information, the content is limited to vehicle position data and is not available to passengers on the vehicle.

The closed circuit systems are limited to use on transit vehicles where each passenger has an individual seat. These systems fails to provide a means for broadcasting to passengers that are standing in a crowded vehicle or seated in seats that lack seatbacks in front of them.

The disclosed broadcast systems also lack the capability to wirelessly receive a continuous stream of updated data while traveling a predetermined route or while the vehicle is temporarily stationary at predetermined stops along the vehicle's route and broadcast the updated data to passengers during transit. Neither do the systems provide a means for wirelessly transmitting the data within the vehicle or confined space where the vehicle is traveling for receipt via devices that are in the possession of passengers.

For these reasons there exists a need for a broadcast system that continuously provides updated multimedia data to passengers traveling in transit vehicles that travel in areas that lack traditional broadcast reception.

SOLUTION

The present transit vehicle broadcast system overcomes the problems outlined above and advances the art by providing a system that wirelessly receives updated multimedia data while the vehicle is traveling a predetermined route and broadcasts the received data to passengers.

The present transit vehicle broadcast system is intended for use in areas where traditional broadcast signals are unavailable to passengers. Storage devices store multimedia data from multimedia program sources and wirelessly transmit the multimedia data to transit transceivers located on each vehicle and stored on servers integrally connected to each transit transceiver. The multimedia data stored by the storage device may be wirelessly received from a multimedia program source. While the vehicle is in transit, the server distributes the multimedia data to one or more video graphic display connected to the server.

The storage device can also wirelessly transmit the multimedia data to distribution transceivers located at predetermined locations along a predetermined route or by means of a communication channel. Updated data can be transmitted to distribution transceivers that wirelessly transmit the updated data to transit transceivers. This provides a means for continuously broadcasting updated information such as news or weather to passengers.

The storage device can also wirelessly receive a continuous stream of multimedia data from a multimedia program source and distribute the received data to a plurality of distribution transceivers located at predetermined locations along the transit vehicle's route. The plurality of distribution transceivers simultaneously transit the received data within a range corresponding to each distribution transceiver for receipt by transit vehicles traveling within the range of successive distribution transceivers. This provides a method for continuously broadcasting updated information such as news or weather to passengers.

In another embodiment the storage device includes a server for selectively updating blocks of data, indexing the blocks and transmitting the updated data along with a directory to distribution transceivers located at station along the route. The individually addressable transit transceivers receive the updated data and directory while they are temporarily stopped at the station and broadcast the received data in accordance with the directory. This provides a method for updating the stored data while the vehicle is traveling a predetermined route. The updated data may include data relating to the vehicles next stop, such as advertisements, news, weather or traffic information. The data can be translated to one or more languages and stored for distribution in multiple languages.

The distribution transceiver can include a radio transceiver for converting the stored data to a predetermined AM/FM or wireless frequency and a transmission antenna to broadcast in a confined area, such as an underground subway system. The transmitted signals can be received AM/FM or wireless devices in the possession of passengers.

Thus, the transit vehicle broadcast system wirelessly transmits updated multimedia data to transit vehicles that travel in areas that lack traditional broadcast reception and distributes the data to passengers while the vehicle is in transit replaces use of systems that distribute outdated prerecorded content to passengers. It also provides a means for wirelessly receiving blocks of data at intermediate stops along the route to maintain the updated data for broadcast while the vehicle travels the predetermined route.

BRIEF DESCRIPTION OF THE DRAWINGS

FIG. 3 is a block diagram of another embodiment of the present transit vehicle multimedia broadcast;

FIG. 4a is a block diagram of the multimedia data;

FIG. 4b is a block diagram of the multimedia data having a modified or new block of data;

DETAILED DESCRIPTION

Figure 1:
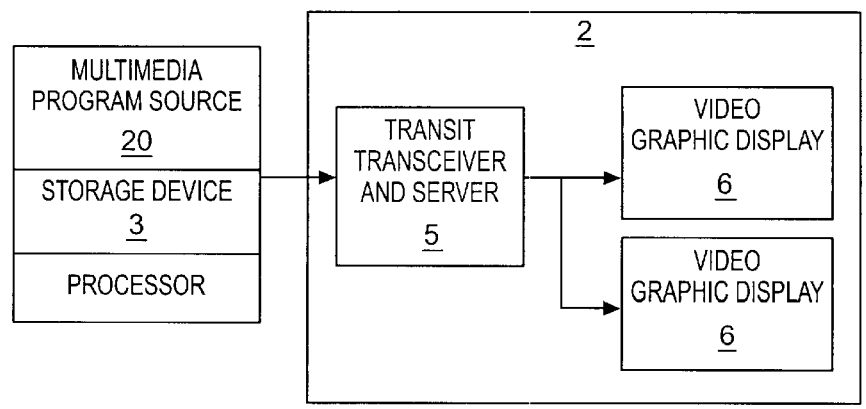
FIG. 1 is a block diagram of a sample transit vehicle multimedia broadcast system using a subway system as an example.

The transit vehicle multimedia broadcast system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

The present transit vehicle multimedia broadcast system provides a means to broadcast updated multimedia data to passengers on transit vehicles while the vehicle is traveling in areas that lack or do not receive traditional wireless broadcast signals. For example, a subway system that travels on the surface or underground where AM/FM, video broadcast, or wireless communication is lacking or absent or travels at speeds that prevent conventional hand-off of cellular signals or reception of continuous AM/FM or video broadcast. Passengers traveling in these areas are a captive audience with time to listen to or watch multimedia broadcast, but lacking the resources to do so.

The transit vehicle broadcast system provides a method for passengers to receive updated information on a closed circuit broadcast system or wirelessly on devices in the possession of passenger. The broadcast may be entertaining, making the travel time more enjoyable, or informational. News, weather, traffic or advertisements may be important to passengers before they reach their destination. It also provides a means for local merchants to bring their product or service to the attention of travelers that otherwise would not have access to the information. The system includes a means for updating the information at intermediate stops or throughout the transit system so that the broadcast can include information such as entertainment or restaurant advertisements targeted to passengers disembarking at the next station.

The new approach allows present information to be wirelessly downloaded for distribution to passengers on closed circuit audio and/or video graphic displays and/or AM/FM and/or wireless frequencies for receipt on passenger AM/FM radio, or other device capable of receiving wireless transmission of multimedia data. The storage device may receive the multimedia data wirelessly from a multimedia program source. The multimedia data is stored on a storage means located at or near the terminus stations and is wirelessly downloaded to transceivers located on the vehicles. The storage device may include a means for compressing the multimedia data, allowing a maximum amount of data to be downloaded in a minimal time. The received data is stored on transit servers for broadcast to passengers on a plurality of video graphic displays connected to the server.

The storage device also transmits updated multimedia data to distribution transceivers located at stations along the route. While vehicles are within range for receiving wireless transmission or temporarily stationary at the stations, distribution transceivers wirelessly transmit the updated data to the transceiver. For illustration, the transit vehicle multimedia broadcast system is described using a subway system although other transit systems, such as aircraft, busses, or trains, may be substituted.

Single Vehicle Transit System—FIG. 1:

For simplicity, FIG. 1 illustrates the new transit vehicle multimedia broadcast system in a subway system having a plurality of stations and one train 2. Train 2 travels a predetermined route between two terminus stations and has scheduled stops at a plurality of stations between the two terminus stations. The multimedia program source 20 includes a storage device 3 for storing multimedia data. The data stored on the storage device may include news, weather or sports broadcasts from sources such as national or local radio, television or cable stations. Storage device 3 also includes a processor for editing or creating multimedia data for broadcast. Multimedia data can be graphics, audio, video, or any combination thereof and can be stored in multiple languages. Local business advertisements similar to traditional commercials may be stored on the server or can be created and broadcast as video graphics and/or text. The multimedia data may include audio for distribution to passengers on the previously described video system, a closed circuit audio system, or a combination thereof.

The multimedia data is wirelessly transmitted from storage device 3 to transit transceiver 5 located on train 2. The transit transceiver is integrally connected to a transit server where the received multimedia data can be stored. The received data may include a directory and the server may have preprogrammed information relating to scheduled stops along the route. The server includes apparatus for decompressing the received data and a processor for using the directory to select data related to the scheduled stops to be distributed to passengers prior to the stop. Each transit vehicle may include one or more video graphic displays 6 connected to the transit server. The video graphic displays may include audio or a separate audio system may be connected to the server. The server may also store the received multimedia data and broadcast the data in a continuous loop to passengers on train 2.

Figure 2:
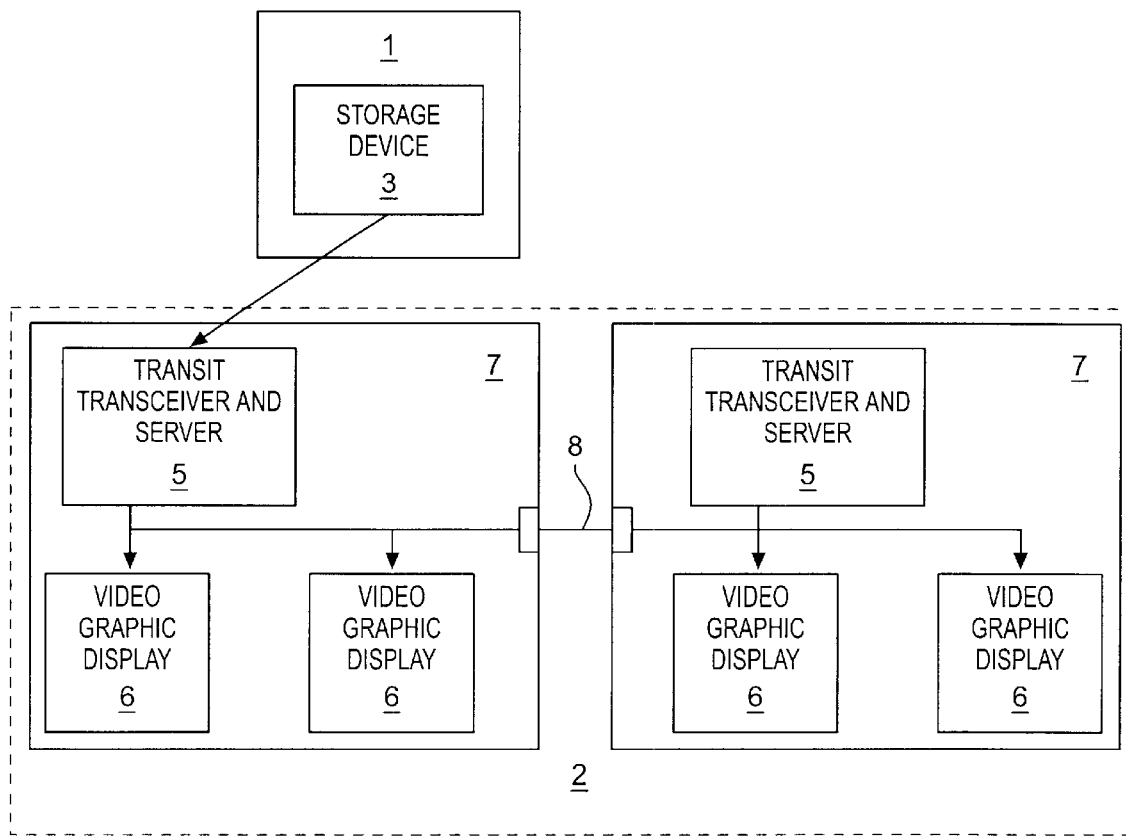
FIG. 2 is a block diagram of another embodiment of the present transit vehicle multimedia broadcast system.

Transit Vehicles with Multiple Cars—FIG. 2:

FIG. 2 illustrates subway train 2 having two cars 7 and having an interconnecting transmission apparatus 8 that connects video graphic displays 6 in both cars 7 to one transit transceiver 5. Although this example describes a train with two cars, additional interconnecting transmission apparatus can be used to connect a plurality of cars to one transceiver. Likewise, FIG. 2 illustrates connection to the transit transceiver in one car although connection to a transit transceiver in the opposite car is possible.

Figure 5:
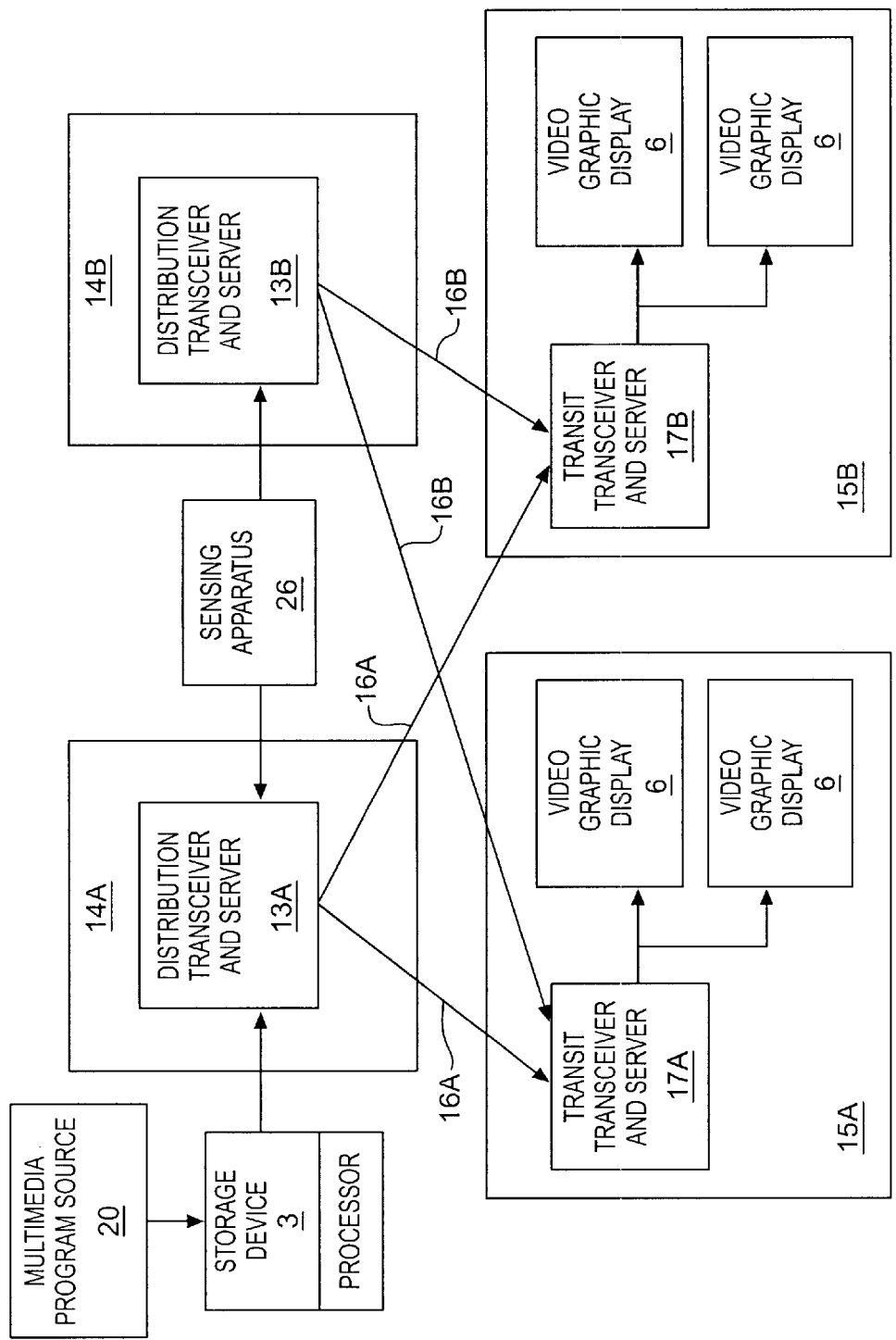
FIG. 5 is a block diagram of yet another embodiment of the present transit vehicle multimedia broadcast system.

Wireless Transmission from a Plurality of Stations—FIGS. 3–5:

In another embodiment of the transit vehicle multimedia broadcast system shown in FIG. 3, multimedia data are transferred from storage device 3 to distribution transceiver 9 located in subway station 1 via communication channel 10. In this example, communication channel 10 is a virtual private network (VPN) although different communication channels can be utilized. Distribution transceiver 9 includes a server integrally connected to distribution transceiver 9. The distribution server includes a processor for individually addressing a plurality of transit vehicles and for accessing stored data. The processor can select present data to be transmitted to individual vehicles based on the scheduled stops each vehicle makes at the plurality of stations.

Storage device 3 can be co-located with distribution transceiver 9 or many miles away. Storage device 3 can include apparatus 22 for compressing multimedia data prior to transmission to allow a maximum amount of data to be transferred in a minimal time. Distribution transceiver 9 wirelessly transmits compressed data to transit transceiver 5 while subway train 2 is temporarily stopped at station 1. After receiving data, transit transceiver 5 decompression apparatus 24 decompresses and stores the multimedia data for broadcast in a continuous loop. Compression and decompression apparatus 22 and 26 are known for compressing and decompressing digitized audio, data and video graphics for storage or for transmission via the telephone network. Such apparatus can be used to compress and decompress the multimedia data described for transmission from storage device 3 to distribution transceiver 9 or transit transceiver 5.

The transit vehicle broadcast system includes capabilities to update the data at the storage device and transmit the modified data to one or more distribution transceivers located at stations along the subway train's route. Each distribution transceiver is independently addressable by the storage device so that data can be transmitted directly to individual distribution transceivers. As illustrated in FIG. 4a, multimedia data 4 can be stored in blocks 11, shown as multimedia data A–D, so that only modified or new block 12, shown in FIG. 4b as multimedia data E, need be transmitted during more frequent stops of shorter duration.

The storage device contains a directory of the blocks of data and transmits the directory along with the data to the distribution transceiver. The storage device can also send a new directory with previously transmitted blocks deleted. The transit transceiver then uses the new directory to sequentially broadcast the data following the directory. Breaking the multimedia data into blocks provides a method for adding or deleting blocks of data or transmitting updated information without requiring downloading of the entire data to be displayed. It also allows updated data to be transmitted at stops of shorter duration such as those experienced on subway routes. This capability allows broadcast of advertisements or present information such as traffic or weather conditions relevant to the vehicles next stop.

As previously disclosed a plurality of distribution transceivers can be located at various stations along the transit vehicle's route and there may be more than one vehicle traveling the route. Each vehicle can be equipped with a transit transceiver to receive multimedia data from the distribution transceivers. FIG. 5 illustrates the broadcast system having two distribution transceivers 13a and 13b located at terminus station 14a and station 14b and two subway trains 15a and 15b. Use of two stations and two trains is for illustration purpose and is not a limitation of the transit vehicle multimedia broadcast system. In this example, terminus station 14a is the starting point of the route and station 14b is an intermittent stop along the route. At terminus station 14a, distribution transceiver 13a may download enough multimedia data 16a to broadcast during the entire route. After train 15a has left terminus station 14a, it makes a temporary stop at station 14b to allow passengers to embark and disembark train 15a. Prior to this temporary stop, storage device 3 may transmit blocks of new or updated data to distribution transceiver 13b. The new or updated data 16b is then wirelessly transmitted to transit transceiver 17a on train 15a during the temporary stop.

Similarly, train 15b traveling the same route will receive multimedia data 16a at the terminus station 14a and may receive updated or new data 16b at the temporary stop at station 14b. As the train makes additional intermittent stops along the route, distribution transceivers located at those stations may transmit updated or new blocks of data to the trains transit transceiver for broadcast. The time required to transmit the updated or new data should not exceed the time that the train will be temporarily stopped at the intermittent stations. Although this embodiment has been described and illustrated with two video graphic displays on each train, the train could include a plurality of cars each having one or more video graphic displays.

Simultaneous Distribution from a Plurality of Distribution Transceivers—FIG. 5:

Referring to FIG. 5, the transit vehicle broadcast system in this embodiment may include a sensing apparatus 26 located between the plurality of distribution transceivers and each transport vehicle. As transport vehicle 15a comes into range of distribution transceiver 13a, distribution transceiver 13a wirelessly transits multimedia data for receipt by transit vehicle 15a's transit transceiver 17a. When transport vehicle 15a leaves the range of distribution transceiver 13a and enters the range of distribution transceiver 13b, distribution transceiver 13b wirelessly transmits the continuous stream of multimedia data 16b to transit transceiver 17a. Wirelessly transmitting the same continuous stream of multimedia data from successive distribution transceivers eliminates the need to identify which blocks of data have been received, rather a continuous stream of data is received by transit transceivers that distributes the multimedia data to video graphic displays without interruption.

The transit vehicle multimedia broadcast system in another embodiment includes a plurality of distribution transceivers located between two terminus stations. The storage device transmits multimedia data simultaneously to the plurality of distribution transceivers in a continuous stream. Each distribution transceiver wirelessly transmits the received multimedia data within a predetermined range, wherein the ranges of the plurality of distribution transceivers encompass the area between the two terminus stations.

Referring to FIG. 5, each distribution transceiver 13a and 13b receives multimedia data and simultaneously wirelessly transmit the received multimedia data 16a and 16b in a continuous steam. Transit vehicles 15a and 15b traveling the predetermined route between the two terminus stations are within the range of one distribution transceiver at all times. Since distribution transceivers 13a and 13b are simultaneously transmitting the same multimedia data 16a and 16b received from storage device 3, transit transceivers 17a and 17b located on transit vehicles 15a and 15b receive a continuous stream of update multimedia data 16a and 16b for broadcast to passengers. Simultaneously transmitting the multimedia data from a plurality of distribution transceiver's eliminates the need for each distribution transceiver to transfer or hand-off, transmission to a successive distribution transceiver for continuous reception by transit transceiver.

As previously described, streams of compressed multimedia data may be received from a multimedia program source 20 and wirelessly transmitted from the storage device to distribution transceivers that wirelessly transit the streams of compressed multimedia data to the transit transceiver where the multimedia data is decompressed. Transit transceivers continuously distribute decompressed multimedia data to a video graphic display located on the transit vehicle. The multimedia data may include present television broadcast retransmitted within the confined space of the transport system or the immediate area of the predetermined route.

Figure 6:
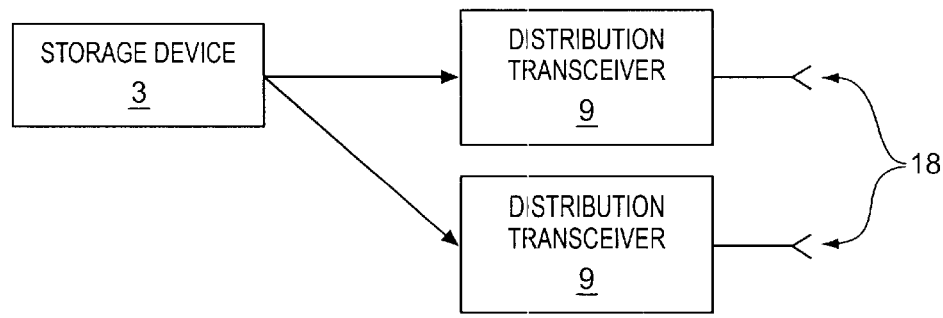
FIG. 6 is a block diagram of another embodiment of the present transit vehicle multimedia broadcast system.
Figure 7:
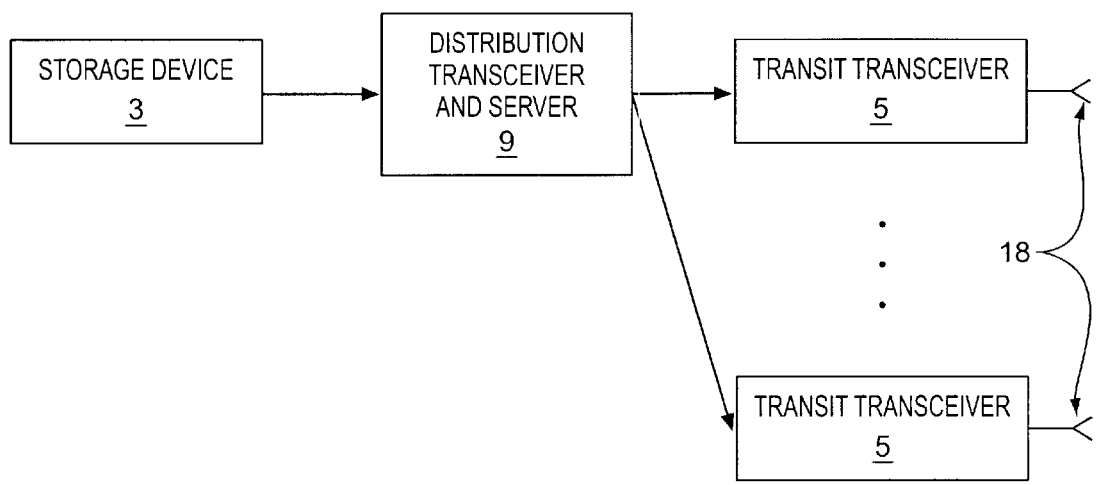
FIG. 7 is a block diagram of another embodiment of the present transit vehicle multimedia broadcast system.

Wireless Broadcast—FIGS. 6–7:

While the previous examples described video broadcast transmitted to video graphic displays located within the transit vehicle, the broadcast could be AM/FM radio signals. In this embodiment of the broadcast system, shown in FIG. 6, a plurality of distribution transceivers 9 are located at predetermined locations within the confined area of subway system. Distribution transceivers 9 include a means for converting the received multimedia data to a predetermined AM/FM audio frequency. Each distribution transceiver 9 is each equipped with at least one transmission antenna 18 to broadcast low power audio messages that can be received via passenger's radios or other device capable of receiving the AM/FM signals. The broadcast area is limited to within a confined an area like an underground subway system. Like the previous examples, distribution transceivers 5 receive data for broadcast from storage device 3. Data received can include a directory and blocks of data in different languages. The distribution transceiver can then broadcast different languages on different frequencies. Since the transmission is in an area that is not accessible to traditional broadcast signals, this broadcast will not interfere with licensed AM/FM broadcast stations.

In another embodiment of the transit vehicle multimedia broadcast system shown in FIG. 7, distribution transceiver 5 receives compressed multimedia data from storage device 3 and wirelessly transmits compressed multimedia data to one or more transit transceivers 5 each located on a transit vehicle. As in a previous example, transit transceiver 5 includes a means for decompressing compressed multimedia data. In this example, transit transceiver 5 includes a means for converting the decompressed multimedia data to one or more predetermined AM/FM or wireless transmission frequencies. Transit transceivers 6 include at least one antenna 18 to broadcast the multimedia data via low power AM/FM radio and/or wireless signals. The broadcast area is small, approximately the length of the transit vehicle, and the area is a confined space that does not conflict with traditional AM/FM or wireless broadcast signals. Passengers carrying devices capable of receiving AM/FM or wireless transmissions, such as laptop computers or cellular telephones, can receive the broadcast. The broadcast is low power and within the confined space of the transit vehicle, thus not requiring registration and licensing.

Alternative embodiments will occur to those skilled in the art. Although the multimedia broadcast system has been described for use within a subway system, alternative transit systems such as trains, busses, or aircraft could be substituted. Similarly, although embodiments were described downloading the compressed multimedia data via a virtual private network, alternative transmission methods could be used. Such variations and alternatives are contemplated, and can be made without departing from the spirit and scope of the invention claimed in the appended claims.

What is claimed is:

1. A transit vehicle broadcast system for a transit vehicle that travels a predetermined route in a confined area where traditional broadcast signals are unavailable to passengers, the predetermined route having at least two terminus stations and a plurality of stations on the predetermined route between the at least two terminus stations comprising:
    a multimedia program source, comprising:
        a storage device, and
        at least one transmitter for wirelessly transmitting the multimedia data to the transit vehicle for broadcast to passengers traveling on the transit vehicle,
    at least one video graphic display means located on the transit vehicle,
    a transit transceiver located on the transit vehicle to wirelessly receive the transmitted multimedia data from the storage device, and
    a server including a means for processing, wherein the server is integral to the transit transceiver and connected to the at least one video graphic display means to store and manage the multimedia data received by the transit transceiver and to distribute the multimedia data to the at least one video graphic display means for broadcast on the transit vehicle.

2. The transit vehicle broadcast system of claim 1, wherein the storage device further comprises:
    a means for compressing the multimedia data to allow a maximum amount of the multimedia data to be transmitted in a minimal time.

3. The transit vehicle broadcast system of claim 2, wherein the server further comprises:
    a means for decompressing the compressed multimedia data received from the storage device.

4. The transit vehicle broadcast system of claim 1, wherein the transit vehicle includes two or more cars, each of the two or more cars having at least one of a plurality of video graphic display means for broadcasting to a plurality of passengers traveling in the two or more cars, further comprising:
    two or more transit transceivers wherein one of the two or more transit transceivers is located on each of the two or more cars,
    two or more servers, wherein one of the two or more servers is integral to the one of the two or more transit transceivers on each of the two or more cars,
    a means for connecting the at least one of the plurality of video graphic display means on each of the two or more cars to the one of the two or more servers located on the corresponding one of the two or more cars.

5. The transit vehicle broadcast system of claim 4, further comprising:
    a means for interconnecting the at least one of the plurality of video display means to the at least one of the plurality of video display means on the adjacent car, whereby one of the two or more transit transceivers receive the stored data from the storage device and the corresponding one of the two or more servers distributes the data to the at least one of the plurality of video graphic display means located on each of the two or more cars for broadcast to a plurality of passengers traveling in the transit vehicle.

6. The transit vehicle broadcast system of claim 1, wherein the multimedia data is stored in a plurality of blocks and the storage device further comprises:
    a means for processing to index the plurality of blocks of multimedia data and selectively edit, delete, or add one or more blocks of the plurality of blocks of multimedia data and create a directory of edited, changed or added blocks of the plurality of blocks, and
    whereby after the storage device has transmitted the multimedia data to the transit transceiver and the server has stored the multimedia data, subsequent transmissions include the directory and the edited, changed or added blocks of the plurality of blocks of multimedia data and the server distributes the plurality of blocks of multimedia data to the at least one video display means following the directory.

7. The transit vehicle broadcast system of claim 1, further comprising:
    a plurality of distribution transceivers that are individually addressable located at the plurality of stations along the predetermined route,
    a means for connecting the plurality of distribution transceivers to the storage device to download the stored multimedia data from the storage device to the plurality of distribution transceivers, and
    wherein the plurality of distribution transceivers wirelessly transmit the multimedia data to the transit transceiver while the transit vehicle is stationary at one of the plurality of stations corresponding to one of the plurality of distribution transceivers.

8. The transit vehicle broadcast system of claim 1, wherein the storage device further comprises:
    a receiver integrally connected to the storage device for wirelessly receiving the data from a multimedia program source.

9. The transit vehicle broadcast system of claim 1, wherein the storage device is located at at least one of the at least two terminus stations and the multimedia data is wirelessly transmitted from the storage device to the transit transceiver while the transit vehicle is temporarily stationary at the at least one of the at least two terminus stations.

10. The transit vehicle broadcast system of claim 1, wherein the at least one transmitter comprises:
a plurality of distribution transceivers located along the predetermined route, wherein each of the plurality of distribution transceivers wireless transmits the multimedia data within a corresponding predetermined range,
a means for connecting the plurality of distribution transceivers to the storage device to download the stored multimedia data from the storage device to the plurality of distribution transceivers,
a plurality of means for sensing when the transit vehicle is within range of each of the plurality of distribution transceivers, wherein each of the plurality of sensing means is integral to each of the plurality of distribution transceivers, and
whereby each of the plurality of sensing means senses when the transit vehicle is within the predetermined range corresponding to the plurality of distribution transceivers and the one of the plurality of distribution transceivers corresponding to the predetermined range wirelessly transmits the received multimedia data to the transit transceiver located on the transit vehicle.

11. The transit vehicle broadcast system of claim 1, further comprising:
a plurality of successive distribution transceivers located along the predetermined route, wherein each of the plurality of successive distribution transceivers wireless transmits the multimedia data within a corresponding predetermined range,
a means for connecting the plurality of successive distribution transceivers to the storage device to download the stored multimedia data from the storage device to the plurality of successive distribution transceivers, and
whereby the plurality of successive distribution transceivers wirelessly transmit the received multimedia data simultaneously and the simultaneously transmitted multimedia data is received by the transit transceiver while the corresponding transit vehicle is traveling in the range corresponding to each of the successive distribution transceivers and the transit transceiver distributes the continuously received multimedia data to the at least one video graphic display means on the transit vehicle.

12. The transit vehicle broadcast system of claim 1, wherein the transit transceiver further comprises:
a means for converting the multimedia data stored on the server to at least one predetermined AM/FM frequency, and
a means for transmitting the at least one converted AM/FM frequency for receipt by AM/FM receiving devices that are in the possession of the passengers and tuned to the at least one predetermined AM/FM frequency.

13. The transit vehicle broadcast system of claim 1, wherein the transit transceiver further comprises:
a means for converting the multimedia data stored on the server to at least one predetermined AM/FM frequency,
at least one audio means located on the transit vehicle, and
a means for connecting the at least one audio means to the transit transceiver, wherein the transit transceiver distributes the at least one converted AM/FM frequency to the at least one audio means for broadcast on the transit vehicle.

14. The transit vehicle broadcast system of claim 1, wherein the transit transceiver further comprises:
a means for converting the multimedia data stored on the server to a predetermined wireless frequency, and
a means for transmitting the converted wireless frequency for receipt by passengers who are in possession of devices capable of receiving wireless transmission at the predetermined wireless frequency.

15. The transit vehicle broadcast system of claim 1, wherein the storage device further comprises:
a means for translating the stored multimedia data to two or more different languages, and
a means for selecting transmission of the stored data in one of the two or more different languages.

16. A transit vehicle broadcast system for a plurality of transit vehicles traveling a predetermined route in a confined area where traditional broadcast signals are unavailable to passengers, the predetermined route having at least two terminus stations and a plurality of stations between the at least two terminus stations comprising:
a multimedia program source, comprising:
at least one transceiver for wirelessly receiving multimedia data from a predetermined source and wirelessly transmitting the received multimedia data to the transit vehicle for broadcast to passengers traveling on the transit vehicle,
at least one distribution transceiver located along the predetermined route to wirelessly receive the multimedia data transmitted from the at least one transceiver,
a transit transceiver located on the transit vehicle to wirelessly receive the multimedia data from the at least one distribution transceiver, and
at least one video graphic display means located on the transit vehicle, wherein the at least one video graphic display means is connected to the transit transceiver and the transit transceiver distributes the multimedia data to the at least one video graphic display means for broadcast on the transit vehicle.

17. A transit vehicle broadcast system to broadcast multimedia data to a plurality of passengers on a plurality of transit vehicles in areas where traditional broadcast signals are unavailable to passengers, wherein the plurality of transit vehicles travel a predetermined route having at least two terminus stations and a plurality of stations along the predetermined route, comprising:
a storage device located at or near the at least two terminus stations to store the multimedia data for broadcast to the plurality of passengers on the plurality of transit vehicles,
a plurality of distribution transceivers to receive the stored multimedia data from the storage device, wherein the plurality of distribution transceivers are located at the plurality of stations,
a means for connecting the storage device to the plurality of distribution transceivers,
a plurality of transit transceivers to wirelessly receive the multimedia data from at least one of the plurality of distribution transceivers, wherein one of the plurality of transit transceivers is located on each of the plurality of transit vehicles,
a plurality of transit servers, wherein each of the plurality of transit servers is connected to one of the said plurality of transit transceivers, a plurality of video graphic means, wherein at least one of the plurality of video graphic means is located within each of the plurality of transit vehicles, and a means for connecting the at least one of the plurality of video graphic means to the corresponding one of the plurality of transit servers, wherein each of said transit servers distribute the multimedia data to the at least one of the plurality of video graphic means for broadcast to the plurality of passengers on the corresponding one of the said plurality of transit vehicles.

18. A method of broadcasting multimedia data to a plurality of passengers on a plurality of transit vehicles traveling a predetermined route in an area where traditional broadcast signals are unavailable, wherein the predetermined route includes at least two terminus stations and a plurality of stations between the at least two terminus stations comprising:

storing the multimedia data on a storage device within a multimedia program source, wirelessly transmitting the stored multimedia data from the multimedia program source to a plurality of transit transceivers each having a means for storing the wirelessly received multimedia data, wherein one of the plurality of transit transceivers is located on each of the plurality of transit vehicles, storing the wirelessly received multimedia data on each of the means for storing of the plurality of transit transceivers, and distributing the stored multimedia data from at least one of the storage means of the plurality of transit transceivers to a plurality of video graphic display means located on the plurality of transit vehicles for viewing by the plurality of passengers, wherein the plurality of video graphic display means are interconnected to each of the storage means of the plurality of transit transceivers.

19. The method of broadcasting of claim 18, further comprising:

downloading the multimedia data from the multimedia storage source to a plurality of distribution transceivers each having a storage means and located at a plurality of locations along the predetermined route, storing the downloaded multimedia data on each of the storage means of the plurality of distribution transceivers, and wirelessly transmitting the stored multimedia data from at least one of the plurality of distribution transceivers to at least one of the plurality of transit transceivers.

20. The method of broadcasting of claim 18, further comprising:

editing the stored multimedia data at the multimedia program source, and downloading the edited multimedia data to one of the plurality of transit transceivers whereby the edited multimedia data is distributed to at least one of the plurality of video graphic display means connected to the storage means of the one of the transit transceivers.

21. A transit vehicle broadcast system for a plurality of transit vehicles traveling a predetermined route in a confined area that lacks traditional broadcast reception, wherein the predetermined route includes at least two terminus stations and a plurality of stations between the at least two terminus stations comprising:

a means for transmitting multimedia data from a multimedia program source having a means for storing the multimedia data, a plurality of means for distributing the multimedia data received from the storage device, wherein one of the plurality of distribution means is located on each of the plurality of transit vehicles, a plurality of video graphic display means, wherein the plurality of transit vehicles each include at least one of the plurality of video graphic display means, and a means for connecting the one of the plurality of distribution means to the at least one of the plurality of video graphic display means on each of the plurality of transit vehicles, whereby the plurality of distribution means distribute the multimedia data to the at least one video graphic display means corresponding to each of the plurality of distribution means for displaying the multimedia data to a plurality of passengers onboard the plurality of transit vehicles.

22. An AM/FM broadcast system for a transit vehicle that travels in a closed environment that does not receive traditional wireless AM/FM broadcast reception comprising:

a multimedia program source, comprising:
    a storage device for storing multimedia data for broadcast to the transit vehicle,
    at least one transmitter for wirelessly transmitting the multimedia data, a plurality of distribution transceivers to wirelessly receive the multimedia data from the storage device, a means for converting the stored multimedia data at each of the plurality of distribution transceivers to at least one predetermined AM/FM frequency, a plurality of transmission antennas, wherein at least one of the plurality of transmission antennas is connected to each of the plurality of distribution transceivers to broadcast the at least one predetermined AM/FM frequency within the closed environment for receipt by AM/FM receiving devices that are in the possession of passengers traveling in the subway system.

23. The AM/FM broadcast system of claim 22, further comprising:

a means for translating the stored multimedia data to two or more different languages, a means for storing the translated multimedia data, a means for indexing the stored translated multimedia data, wherein the stored translated multimedia data in each of the two or more languages is selected from the indexing means and converted to two or more predetermined frequencies allowing transmission of the stored data in different languages on different frequencies.

* * * * *